(12) United States Patent
Schroder

(10) Patent No.: US 6,251,459 B1
(45) Date of Patent: *Jun. 26, 2001

(54) DAIRY PRODUCT AND METHOD

(76) Inventor: Bruce G. Schroder, c/o Dairilean, Inc., P.O. Box 88647, Sioux Falls, SD (US) 57105

(*) Notice: Subject to any disclaimer, the term of this patent is extended or adjusted under 35 U.S.C. 154(b) by 0 days.

This patent is subject to a terminal disclaimer.

(21) Appl. No.: 08/270,429

(22) Filed: Jul. 5, 1994

Related U.S. Application Data

(63) Continuation-in-part of application No. 07/954,862, filed on Sep. 30, 1992, now Pat. No. 5,352,468.

(51) Int. Cl.⁷ ................ A23C 23/00; A23L 2/52; A23L 2/74
(52) U.S. Cl. ............ 426/330.2; 426/478; 426/491; 426/495; 426/523; 426/583; 426/492
(58) Field of Search ................ 426/583, 330.2, 426/523, 478, 491, 495, 492

(56) References Cited

U.S. PATENT DOCUMENTS

| | | | |
|---|---|---|---|
| 1,085,380 | 1/1914 | Downham . | |
| 2,712,504 | * 7/1955 | Coulter | 426/491 |
| 3,669,678 | 6/1972 | Kraft | 99/28 |
| 3,896,241 | 7/1975 | Malaspina et al. | 426/271 |
| 3,949,098 | 4/1976 | Bangert | 426/324 |
| 4,086,367 | 4/1978 | Ziccarelli | 426/98 |
| 4,309,417 | 1/1982 | Staples | 424/128 |
| 4,409,247 | 10/1983 | Baret et al. | 426/41 |
| 4,478,855 | 10/1984 | Dahlen et al. | 426/41 |
| 4,486,413 | 12/1984 | Wiesenberger et al. | 424/177 |
| 4,761,295 | 8/1988 | Casey | 426/549 |
| 4,857,355 | 8/1989 | Gregg | 426/590 |
| 4,931,300 | 6/1990 | Monte | 426/335 |
| 4,954,361 | * 9/1990 | Girsh | 426/491 |
| 5,352,468 | * 10/1994 | Schroder | 426/330.3 |

FOREIGN PATENT DOCUMENTS

| | | |
|---|---|---|
| 0019415 | 7/1980 | (EP) . |
| 0364053 | 12/1989 | (EP) . |

OTHER PUBLICATIONS

V.H. Holsinger et al., Fortifying Soft Drinks with Cheese Whey Protein, Food Technol. 27(2); 59, 1973.
V.H. Holsinger et al., Whey Beverages: A Review, J. Dairy Sci 57(8); 849, 1974.
P. Jelen, Compositional Analysis of Commerical Whey Drinks, J. Dairy Sci. 70; 892–895, 1987.
Penny Dodds, Whey Beverage Technology, Cultured Dairy Products Journal, May 1989.
D.K. Newman, The Treatment of Urinary Incontinence in Adults, Nurse Practitioner, 21, Jun. 1989.
D.K. Newman, Modern Urine Chemistry Manual, Nurse Practitioner Jun. 1989, 41–42, Jun. 1989.
Jack Mans, Fines as High as $100,000 Per Day, Dairy Foods, 89, Apr. 1993.
J.M. Fresnel, Swiss Scientists Develop Soft Drink from Whey, 1993.

* cited by examiner

Primary Examiner—Helen Pratt
(74) Attorney, Agent, or Firm—Peter K. Trzyna, Esq.

(57) ABSTRACT

A method of making a dairy product includes the steps of separating substantially pure dairy water from a dairy staring material, making the dairy water into a dairy product for consumption, the dairy product being substantially pure and free of impurities from the dairy starting material and packaging the dairy product.

15 Claims, No Drawings

DAIRY PRODUCT AND METHOD

CROSS REFERENCE TO A RELATED APPLICATION

This is a continuation-in-part of U.S. application Ser. No. 07/954,862, filed Sep. 30, 1992, now U.S. Pat. No. 5,352,468.

THE TECHNICAL FIELD

This invention relates generally to a process concentrate and dairy products made therefrom.

BACKGROUND OF THE INVENTION

Numerous drinks, foods and the like are available for consumption and usage. Most consumer products do not take advantage of under utilized resources—whey, milk and their components.

Cow (bovine) milk contains about 87 percent (%) water, 3% casein, 0.65% whey protein, 4.5% to 5.0% lactose, 3% to 4% milk fat, 0.3% to 0.7% mineral salt plus a variety of water and fat soluble vitamins, lactic and citric acids, urea, free amino acids and polypeptides. In the manufacture of cottage cheese or casein, the milk fat is first separated centrifugally (as cream) and the casein fraction of the milk is then precipitated at its isoelectric point by the addition of acid. The precipitated casein, about 1/10th of the original weight of the milk, is then treated to yield the desired casein product. The remainder of the original milk, containing all of the other components listed above, is called whey.

For other cheeses, the process varies somewhat. The whole or part skim milk is treated with an enzyme (such as rennet, porcine pepsin or a vegetable enzyme) to coagulate and precipitate casein. The precipitated casein, called "curd". is cut and treated in a suitable manner to yield the desired cheese, with the remainder of the original milk, called whey, being drained off the curd.

The average composition of whey obtained from ordinary cow milk (whole milk) is 93 (weight percent) wt % water, 1 wt % protein, 0.3 wt % fat, 5 wt % carbohydrates and 0.7 wt % ash. Whey often has a pH in the range of about 4 to about 7 but raw whey can be neutral, acidic or basic.

For example, cheese whey from Cheddar, Swiss or Italian cheese has a pH of 5.8 to 6.2 whereas whey from cottage cheese has a substantially lower pH.

Whey, because of its about 5.6 to about 6.5 wt % solids content, has long been recognized as a serious pollutant. However, its protein content (about 0.6 to about 0.8 wt %) has untapped commercial value and the unusual property of being acid soluble. Whey proteins also have an excellently well balanced ratio of essential amino acids making it a satisfactory source of protein for food fortification. The water and solid components of whey and milk do not now have high commercial value.

Whey can be subjected to filtration to produce a retentate and permeate that, for example, can be incorporated into a drink. European Patent Application Nos. 0 019 415 (Stauffer Chemical Company) and 0 364 053 (DMV-Campina P.V.) disclose drinks made from retentate and permeate, respectively.

The water separated from the milk is commonly referred to as dairy water or cow water. Even when substantially pure, the dairy water contains up to about 1,000 parts per million (ppm) of impurities, such as carbohydrates, protein and other non-water components of milk. It is difficult, if not impossible, to remove all of the impurities. It is also not cost effective to remove all of the impurities. According to government agencies, these impurities make the dairy water unfit for human ingestion.

It would be desirable to add value to milk, whey and their components. The present invention satisfies this desire.

SUMMARY OF INVENTION

Methods of making a process concentrate suitable for use to make a batch concentrate or a dairy product are disclosed. The process concentrate contains a liquid dairy base (1) which is sterilized, (2) to which is added an aliquot of the total amount of the preservative in the batch concentrate (which preferably yields the correct amount of preservative that is in the dairy product) or (3), when the dairy base is a retentate or dairy water, to which is added substantially all of the preservative in the dairy product. The batch concentrate contains either (1) water, the remainder of the preservative and the process concentrate or (2) the process concentrate and other components. The dairy base can be retentate or permeate of a dairy starting material, e.g., milk, defatted milk, whey, defatted whey, permeate, retentate and defatted retentate or the dairy water obtained from a dairy starting material.

If the dairy base is a permeate and the dairy product is a drink, it is important to stability that only an aliquot of the preservative be present in the process concentrate. If the total amount of the preservative is present in the process concentrate then the preservative could crystallize out at room temperature. The present method enables the production of process concentrate and batch concentrate that are stable at room temperature.

The process concentrate of alternate (2), above, to make the drink can be made by mixing the liquid dairy base and the preservative aliquot, preferably at an elevated temperature, for a time period effective to form a homogeneous mixture. The pH of the dairy preservative mixture is reduced to a pH at which the preservative is effective, i.e., a pH below about 7. The temperature of the process concentrate can then be lowered to room temperature. The preservative is present in an amount effective to have a preserving effect on the process concentrate and remain in solution at the room temperature.

The batch concentrate, from the process concentrate of alternate (2), above, used to make the drink can preferably be prepared by mixing the remaining preservative with water followed by mixing with the process concentrate. The total amount of preservative in the batch concentrate preferably is an amount that remains in solution at room temperature and provides both a preserving effect and the total amount of preservative in the dairy product.

The retentate and permeate are produced by the filtration of the dairy starting material. The composition of the retentate and permeate depend upon the starting material and the type of filtration. The dairy water is the permeate from the reverse osmosis of the dairy starting material.

The dairy product can be a drink, cheese spread, dip, dessert, consumer products (e.g., personal care products and pet care products) or the like made from the process or batch concentrate or dairy water. The drink can be produced by mixing the batch concentrate with water.

The dairy product also can be used in a method of treating a urinary tract of a patient in need of such treatment by administering an effective amount of the dairy product including the dairy base and lowering the pH of the patient's urine and urinary tract. Treatment of a patient's urinary tract can be effected in a convenient manner by administering the dairy product in drink form.

Dairy products produced by any of the above-described methods provide another use for milk, defatted milk, permeate, retentate and defatted retentate and a beneficial use for whey and defatted whey. The present methods enable the use of permeate or retentate without requiring an additional treatment such as the hydrolysis of lactose. Production of the process concentrate and batch concentrate provides value to the dairy starting material and facilitates further processing.

In a further method of making a dairy product, dairy water is separated from a dairy starting material and exposed to a sterilization process to make the dairy water fit for ingestion.

In another embodiment, a dairy product includes substantially pure, fit for ingestion, dairy water.

In a further embodiment, a dairy product includes milk or a milk component, e.g., whey, whey proteins, casein and the like, and at least one acid, base or preservative.

In yet another embodiment, a method of using dairy water to produce a dairy product includes the steps of incorporating dairy water into a consumer product and packaging the consumer product. The dairy water preferably is substantially pure.

Numerous other advantages and features of the present invention will become readily apparent from the following detailed description of the preferred embodiments and the appended claims.

DETAILED DESCRIPTION OF THE PREFERRED EMBODIMENTS

Although this invention is susceptible to embodiment in many different forms and will be described in detail, presently preferred embodiments of the invention are described. It should be understood, however, that the present disclosure is to be considered as an exemplification of the principles of this invention and is not intended to limit the invention to the embodiments illustrated.

A process concentrate can be used to make a batch concentrate or a dairy product. The process concentrate includes a liquid dairy base (1) which is sterilized, (2) to which is added an aliquot of the total preservative in the batch concentrate or (3), when the dairy base is a retentate or dairy water, to which is added substantially all of the preservative in the dairy product.

The process concentrate of alternate (2), above, preferably is stable and made from permeate, includes the steps of mixing the dairy base and the preservative aliquot to form a homogeneous mixture and reducing the pH of the mixture by mixing food grade acid therewith. Preferably, the preservative and the dairy base are mixed prior to mixing the acid therewith. Preferably, the mixing is performed at an elevated temperature. Optionally, the method also includes the step of lowering the temperature of the process concentrate to room temperature. The preservative aliquot in the process concentrate is an amount effective to have a preserving effect on the process concentrate and not separate out of the process concentrate at room temperature. The acid is used to reduce the pH of the mixture to a pH at which the preservative is effective. acid The term "stable", as used in its various grammatical forms to define the process or batch concentrate, means that the components do not separate out at room temperature. For example, the preservative does not separate out of the process concentrate.

The term "room temperature", as used in its various grammatical forms, identifies a temperature in the range of about 15° to about 30° C.

The term "batch concentrate", as used in its various grammatical forms, identifies a concentrate that contains substantially all of the preservative that will be in the dairy product.

The term "preserving effect", as used in its various grammatical forms, means that the spoilage of the concentrate being discussed is inhibited.

Especially when the dairy product is a drink from a batch concentrate and the process concentrate is made using permeate from whey, it is important that the preservative not separate out. Therefore, the total amount of preservative in the batch concentrate cannot be used in the process concentrate.

The batch concentrate, especially for a permeate-containing drink, is stable at room temperature and is made by mixing the remainder of the preservative with water to form a second homogeneous mixture that is mixed with the process concentrate to produce the batch concentrate. The total preservative in the batch concentrate is an amount effective to have a preserving effect on the batch concentrate.

The pH of the batch concentrate can be reduced to a pH at which the preservative is effective using additional food grade acid. Alternatively, the acid present in the process concentrate can be an amount effective to obtain a pH in the batch concentrate at which the preservative is effective. In a further alternative, a base can be used to obtain a pH at which the preservative is effective.

The dairy product can be a drink, cheese spread, dip, frozen dessert, consumer products (e.g., personal care and pet care products) or the like made from the process or batch concentrate. When the dairy product is a drink it can be produced by diluting the batch concentrate with additional water, e.g., distilled, uncarbonated, carbonated, dairy and the like, and mixing. The drink can have a relatively low viscosity such as soft drink or a relatively high viscosity such as a shake or frappe.

Sweetening agents, vitamins, minerals, food coloring, flavorants, stabilizers and the like can be added to the process concentrate, batch concentrate or diluted batch concentrate.

Alternatively, the dairy product can be made by sterilizing the dairy base before or after further processing. Further processing can include packaging, mixing with other components of the dairy product and the like.

The dairy product can be used to treat a urinary tract of a patient in need of treatment. The treatment method includes the steps of administering an effective amount of the dairy product that includes the dairy base and lowering the pH (acidification) of the urine and the urinary tract. Preferably, the treatment also includes the step of monitoring the condition of the urinary tract. The dairy product acidifies the urine and the urinary tract to inhibit or prohibit the growth of bacteria in the urinary tract. The suitable dairy product preferably contains nonprotein nitrogen, vitamin C, potassium, lactose, benzoate preservative and fructose. It is presently theorized that one or more of these components of the dairy product contribute to urine tract acidification. The dairy product can be administered repeatedly throughout the day to maintain a low pH in the urinary tract or can be administered periodically to temporarily lower the pH and permit the pH to rise prior to again administering the dairy product. Preferably, the dairy base is the permeate obtained from whey and the dairy product is a drink.

The dairy base is the retentate or permeate of the filtration of the dairy starting material, e.g., milk, defatted milk, whey, defatted whey, permeate, retentate or defatted retentate or the dairy water obtained by evaporation and condensation of water from the dairy starting material. Preferably, the milk is cow (bovine) milk and the dairy starting material is obtained from cow milk. Most preferably, the dairy starting material is permeate, especially from cheese whey. Alternatively, the milk can be from another dairy animal such as a goat. The defatted milk, whey and retentate are conventional products that can be produced by centrifuging to separate the fat therefrom. Any edible whey can be used individually or admixed with other whey. Thus, cheddar cheese whey can be used with cottage cheese whey. Preferably, the whey is a sweet whey.

Filtration is a known process that separates the dairy starting material into retentate and permeate using a semi-permeable membrane. The membrane permits water and, depending upon the selection of the membrane and operating conditions of the filtration process, low molecular weight substances dissolved in the dairy starting material to pass therethrough (permeate) but retains higher molecular weight substances (retentate), e.g., colloidally disbursed proteins, micelles of protein and minerals, fat globules and the like. Filtration can be accomplished using ultrafiltration (UF), reverse osmosis (R/O) and the like.

When R/O is utilized, the permeate is dairy water which is substantially all water. The dairy water is treated twice, once biologically by the animal and once mechanically by R/O or evaporation/condensation.

The composition of the retentate and permeate depend upon the dairy starting material, filtration temperature and the filter membrane. Typical compositions for whole milk, skim milk and whey are provided below.

TABLE I

UF WHOLE MILK ANALYSIS
PERCENT ANALYSIS

| Conc. Factor[1] | Total Solids | Fat | Protein | Lactose | Ash |
|---|---|---|---|---|---|
| Retentate: | | | | | |
| 1X | 13 | 4 | 3 | 4.7 | 0.8 |
| 3X | 29 | 13 | 10 | 4.1 | 1.3 |
| 5X | 43 | 22 | 16 | 3.2 | 1.9 |
| Permeate: | | | | | |
| 1X | 5.7 | 0 | 0.0 | 4.8 | 0.5 |
| 3X | 6.1 | 0 | 0.06 | 5.1 | 0.5 |
| 5X | 6.1 | 0 | 0.5 | 5.2 | 0.5 |

[1]Concentration Factor.

TABLE II

UF SKIM MILK ANALYSIS
PERCENT ANALYSIS

| Conc. Factor[1] | Total Solids | Protein | Lactose | Ash |
|---|---|---|---|---|
| Retentate: | | | | |
| 1X | 8.5 | 3 | 5 | 0.74 |
| 3X | 15.5 | 9 | 4.7 | 1.26 |
| 5X | 21.8 | 15 | 4.5 | 1.70 |
| Permeate: | | | | |
| 1X | 5 | 0 | 4.5 | 0.4 |
| 3X | 5.7 | 0.1 | 5.3 | 0.5 |
| 5X | 6.1 | 0.1 | 5.5 | 0.5 |

[1]Concentration Factor.

TABLE III

UF WHEY ANALYSIS
PERCENT ANALYSIS

| Conc. Factor[1] | Total Solids | Lactose | Protein |
|---|---|---|---|
| Retentate: | | | |
| 1X | 6 | 4 | 0.7 |
| 2.5X | 7.3 | 3.7 | 1.9 |
| 10X | 13.5 | 4.0 | 7.1 |
| 20X | 20 | 3.2 | 12.1 |
| Permeate: | | | |
| 1X | 5.2 | 3.8 | 0.24 |
| 2.5X | 5.2 | 3.9 | 0.3 |
| 20X | 6.2 | 4.5 | 0.7 |
| Commercial | 12.0 | 10.5 | 0.38 |
| Commercial | 24.0 | 21.0 | 0.7 |

[1]Concentration Factor.

Typically, the composition of the permeate is, if produced from a R/O process, dairy water or, if produced from a UF process, about 75 to about 95 wt % water, about 0.1 to about 0.5 wt % protein and about 5 to about 25 wt % total other solids. The other solids include carbohydrates, fats and ash. The permeate at an elevated solids concentration is preferably at an elevated temperature to maintain the solubility of the lactose.

The preservative is preferably a benzoate such as sodium, potassium benzoate and the like. Potassium benzoate is preferred because of the desire to reduce sodium consumption. The benzoate can be a crystal that is dissolved in water prior to use. For dairy water, known preservatives for water can also be used, e.g., chlorine, iodine, and the like. The preservative can have a flavoring effect.

The acid can be a flavorant for the dairy product. Representative acids include citric acid, phosphoric acid, hydrochloric acid and other conventional food grade acids.

Representative bases include sodium hydroxide, calcium hydroxide and the like.

Sterilization can be accomplished by the application of heat, e.g., a pasteurization temperature or higher, a chemical, irradiation or the like. Sterilization can be performed before or after the addition to the dairy base of other components of the process concentrate.

The sweetening agent can be a natural or artificial sweetener. Representative sweetening agents include sugar, fructose, aspartame (commercially available under the tradename Nutrasweet®), corn sweetener and the like.

The vitamins and minerals that can be present are conventional. Representative vitamins are ascorbic acid (vitamin-C), and the like. Representative minerals are potassium and the like.

The conventional flavorant is natural or artificial, an extract or flavor or a mixture thereof. Representative flavorants include citric acid (to provide an citric flavor), phosphoric acid (cola), orange, lime, lemon and the like.

The conventional colorant is natural, artificial or a mixture thereof.

The conventional stabilizer is natural, artificial or a mixture thereof. Representative stabilizers include gums, starches and the like. The stabilizer can thicken the product.

The dairy product drink can be carbonated as by using carbonated water instead of uncarbonated water when diluting the batch concentrate or by injecting gaseous carbon dioxide into the concentrate or dairy product.

The water used in the batch concentrate or to dilute the batch concentrate can be dairy water.

The composition of the process and batch concentrates depend upon the dairy base used and the type of dairy product to be produced. Representative compositions are provided below.

The process concentrate can contain, based on the total weight of the components present, about 90 to about 99, preferably about 91 to about 98, wt % dairy base, about 0 to about 0.8, preferably about 0.01 to about 0.8, most preferably about 0.01 to about 0.7, wt % preservative and about 1 to about 10, preferably about 2 to about 9, wt % acid.

The batch concentrate can contain, based on the total weight of the components present, about 1 to about 90, preferably about 30 to about 50, wt % water, about 0 to about 0.8, preferably about 0.01 to about 0.8, most preferably about 0.01 to about 0.7, wt % preservative and about 10 to about 50, preferably about 10 to about 45, wt % process concentrate. The total solids content is about 10 to about 40 wt %. The total amount of preservative in the batch concentrate is preferably about 0.01 to about 0.7 wt %. The total amount of acid in the batch concentrate is that effective to lower the pH of the batch concentrate to a pH at which the preservative is effective. The total amount of acid depends upon the pH and amount and type of the retentate or permeate, preservative and the like.

The batch concentrate can be diluted with water at a weight ratio of about 99:1 to about 1:99, preferably about 10:1 to about 1:10, of batch concentrate to water to produce a drink.

The sweetening agent, vitamins, minerals, flavorant, colorant and stabilizers, if utilized, are present in amounts effective to obtain the desired sweetness, nutritional content, flavor, color and stability.

The dairy base and preservative aliquot preferably are mixed at a temperature in the range of about 15° C. to a sterilization temperature, preferably to about 75° C. for a time period effective to form the homogeneous mixture.

The process concentrate can be made directly into the dairy product or into the batch concentrate which can then be made into the dairy product.

When the dairy base is dairy water, it can be made into a dairy product by separating the dairy water from the dairy starting material and preparing the dairy water for ingestion such as by exposure to sterilization, addition with carbonation, flavoring or preservatives or the like or by packaging the dairy water. The dairy water can be made fit for ingestion by sterilization, either before or after being separated from the dairy starting material. Preferably, the dairy water is substantially pure. It is possible to combine the dairy water to produce other dairy products, food products, consumer products and the like.

The term "fit for ingestion", as used in its various grammatical forms, indicates that the dairy water meets or exceeds the minimum requirements of the United States Food and Drug Administration or other governmental agency for products to be ingested by humans.

The term "substantially pure", as used in its various grammatical forms, indicates that the dairy water contains impurities from the milk in an amount less than about 10,000, preferably less than about 1,000, most preferably less than about 500, parts per million (ppm). Representative impurities include carbohydrates, proteins, ash, lactose and other non-water components from milk. The term substantially pure relates to the amount of impurities from milk or milk components that are present in the dairy water and does not preclude the presence of ingredients from non-milk sources in the dairy products, food products, consumer products or the like made using the dairy water.

In a further embodiment, a dairy product includes milk or a component of milk and at least one acid, base or preservative. A preferred component of milk is proteins, whey, whey proteins, casein and the like. The proteins, including the whey proteins and casein, also have functionality for many applications, e.g., food, medical and the like.

In yet a further embodiment, a method of using dairy water includes the steps of incorporating dairy water into a consumer product and packaging the consumer product. The consumer product is a non-food product that can be a personal care product, a health care product, an animal care product, a plant care product, a household product or the like. The consumer product can be applied to a person or animal. Preferred consumer products include shampoos, conditioners, body lotions, rinses, cleansers and the like. A conventional base, e.g., a shampoo, conditioner, body lotion, etc. base, is mixed with the dairy water to produce the desired consumer product. The dairy water can be the water phase of the consumer product.

The following Examples are given by way of illustration, and not limitation.

Comparative Example 1
Preparation of Concentrate A Including Fructose

An unsuccessful attempt was made to make process concentrate using permeate from the filtration of cheese whey. A commercial permeate was used having a solids content of about 12 wt % of which about 89 wt % was lactose, about 9 wt % was ash and the remainder was protein and fat. The concentrate A included the permeate, a potassium benzoate solution, citric acid and fructose. The wt %, wt grams (g)%, and pH for each component are provided in TABLE IV, below. The potassium benzoate solution was made by dissolving 109 g of potassium benzoate in 363 g of water.

TABLE IV

COMPOSITION OF CONCENTRATE A

| Parameter<br>Component | wt % | wt (g) | pH[1] |
|---|---|---|---|
| Permeate | 68.1 | 3,092 | 6.05 |
| Potassium Benzoate Solution[2] | 0.5 | 23 | 6.02 |
| Citric Acid | 2.4 | 109 | 2.74 |
| Fructose | 29.0 | 1,312 | 2.68 |

[1]Measurement after addition of this component.
[2]The potassium benzoate solution was made by dissolving 109 g of potassium benzoate commercially available from Miles Inc. Elkhart, IN and 363 g of water.

The permeate was introduced into a suitable vessel. The potassium benzoate solution was then slowly added to the permeate with mixing to produce a homogeneous permeate and benzoate mixture. Next, the citric acid was slowly introduced into the vessel with mixing. Then, the fructose was introduced into the vessel with mixing until the fructose was dissolved. The resultant concentrate A was unsatisfactory because it crystallized and settled out.

Comparative Example 2
Preparation of Concentrate B

An unsuccessful attempt was made to make a concentrate B using the commercial permeate of COMPARATIVE EXAMPLE 1, the potassium benzoate solution and citric acid. A drop of defoamer commercially available from Dow was first added to the permeate. The components, the wt(g) and wt % of each component utilized and the pH of the mixture after addition of each component are listed in TABLE V, below.

TABLE V

COMPOSITION OF CONCENTRATE B

| Parameter Component | wt (g) | wt % | pH[1] |
|---|---|---|---|
| Permeate | 3,632 | 96.4 | 6.2 |
| Potassium Benzoate Solution[2] | 30.1 | 0.8 | 6.2 |
| Citric Acid | 104 | 2.4 | 3.3 |
| Defoamer | 1 drop | — | — |

[1]Measurement after addition of this component.
[2]The potassium benzoate solution was made by dissolving 109 g of potassium benzoate commercial available from Miles Inc. Elkhart, IN and 363 g of water.

The permeate was introduced into a suitable vessel and the defoamer was then added with mixing. The potassium benzoate was slowly added with mixing. Next, the citric acid was slowly added with mixing until it was dissolved. After about a short time period the mixture started to crystallize.

The concentrates of COMPARATIVE EXAMPLES 1 and 2 both failed. Both of the experimental concentrates use potassium benzoate in an amount so that the addition of subsequent potassium benzoate was not necessary.

EXAMPLE 1
Production of Process Concentrate

The commercial permeate had a water content of about 88 wt %, a dry matter content (carbohydrate) of about 11 wt % and a protein, crude fat, ash, calcium, sodium, potassium, magnesium and the like of about 1 wt %.

TABLE VI

PROCESS CONCENTRATE

| Parameter Component | wt (g) | wt % | pH[1] |
|---|---|---|---|
| Permeate | 3,480 | 95.9 | 6.2 |
| Potassium Benzoate Solution[2] | 21.6 | 0.6 | 6.13 |
| Citric Acid | 126 | 3.5 | — |
| Defoamer | 0.36 | 0.001 | — |

[1]Measurement after addition of this component.
[2]The potassium benzoate solution was made by dissolving 3.6 g of potassium benzoate commercial available from Miles Inc. Elkhart, IN and 18 g of water.

The permeate was introduce into a suitable vessel. The temperature of the permeate was 124° F. The defoamer was added to the permeate. The potassium benzoate solution was added with mixing. The citric acid was then added with mixing. Mixing stopped after the acid had dissolved. The process concentrate was permitted to cool to 70° F. The process concentrate did not crystallize.

EXAMPLE 2
Preparation of Batch Concentrate

A batch concentrate was produced using the process concentrate of EXAMPLE 1. Into a suitable vessel, 1,640 g of water and 8 g of potassium benzoate at 70° C. were introduced and mixed until the benzoate had dissolved. Then, 5.8 g of aspartame and 5.2 g of ascorbic acid were add and mixed until the aspartame was dissolved. Then, 660 g of fructose was added and mixed until dissolved. Then, 1,640 g of the process concentrate of EXAMPLE 1 was added and mixed. Lastly, 32 g of flavorant was added and mixed. The resultant batch concentrate was stable and did not crystallize or settle out at 70° F. or 35 F.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

I claim:

1. A method of making a non-milk dairy beverage comprising the steps of:
   subjecting material selected from the group consisting of
      milk,
      defatted milk,
      whey,
      defatted whey,
      permeate, retentate and defatted retentate of the filtration of a dairy starting material and condensate of the evaporated water from dairy starting material to reverse osmosis to separate a pure dairy water permeate therefrom;
   combining the dairy water with a non-milk additive in a non-milk dairy product for consumption, the dairy product being substantially pure and free of impurities from the dairy starting material; and
   packaging the substantially pure non-mile dairy beverage.

2. The method of claim 1 further comprising the step of combining the dairy water and at least one non-milk source additive selected from the group consisting of preservatives, acids, bases, carbonation, sweetening agents, vitamins, minerals, food colorings, flavorants and stabilizers.

3. The method of claim 1 further comprising the step of combining the dairy water and at least one preservative.

4. The method of claim 1 further comprising the step of combining the dairy water and at least one acid.

5. The method of claim 1 further comprising the step of combining the dairy water and at least one base.

6. The method of claim 1 further comprising the step of combining the dairy water and carbonation.

7. The method of claim 1 further comprising the step of combining the dairy water and at least one sweetening agent.

8. The method of claim 1 further comprising the step of combining the dairy water and at least one vitamin.

9. The method of claim 1 further comprising the step of combining the dairy water and at least one mineral.

10. The method of claim 1 further comprising the step of combining the dairy water and at least one food coloring.

11. The method of claim 1 further comprising the step of combining the dairy water and at least one flavorant.

12. The method of claim 1 further comprising the step of combining the dairy water and at least one stabilizer.

13. A packaged, substantially pure non-milk dairy beverage made in accordance with claim 1.

14. A method of using a dairy starting material in a consumer product, the method comprising the steps of:

separating pure dairy water permeate from a dairy starting material by reverse osmosis:

incorporating the separated pure dairy water into a consumer product, the consumer product being substantially pure and free of impurities from the dairy starting material; and packaging the consumer product.

15. The method of claim 1 further comprising the step of exposing the dairy water to a sterilization process to make the dairy water fit for ingestion.

* * * * *